US012418473B2

(12) United States Patent
Das et al.

(10) Patent No.: US 12,418,473 B2
(45) Date of Patent: Sep. 16, 2025

(54) SYSTEMS AND METHODS FOR PROVIDING MULTIPATH CONNECTIVITY INTELLIGENCE

(71) Applicant: Federated Wireless, Inc., Arlington, VA (US)

(72) Inventors: Deepak Das, Lexington, MA (US); Arijit Banerjee, Melrose, MA (US)

(73) Assignee: FEDERATED WIRELESS, INC., Arlington, VA (US)

( * ) Notice: Subject to any disclaimer, the term of this patent is extended or adjusted under 35 U.S.C. 154(b) by 0 days.

(21) Appl. No.: 18/166,678

(22) Filed: Feb. 9, 2023

(65) Prior Publication Data

US 2023/0261976 A1 Aug. 17, 2023

Related U.S. Application Data

(60) Provisional application No. 63/310,283, filed on Feb. 15, 2022.

(51) Int. Cl.
*H04L 45/24* (2022.01)
*H04L 41/16* (2022.01)
*H04L 45/42* (2022.01)

(52) U.S. Cl.
CPC .............. *H04L 45/24* (2013.01); *H04L 41/16* (2013.01); *H04L 45/42* (2013.01)

(58) Field of Classification Search
CPC .......... H04L 45/24; H04L 45/42; H04L 41/16
USPC ....................................................... 709/238
See application file for complete search history.

(56) References Cited

U.S. PATENT DOCUMENTS

2020/0252300 A1* 8/2020 Levy-Abegnoli ............................ H04L 41/0895
2022/0109622 A1* 4/2022 Yeh .......................... H04L 69/40

FOREIGN PATENT DOCUMENTS

| CN | 109133078 A | * | 3/2022 | |
| EP | 4142245 A1 | * | 3/2023 | ............. H04L 45/02 |
| WO | WO-2018042459 A1 | * | 3/2018 | ........... H04L 45/302 |

* cited by examiner

*Primary Examiner* — Glenford J Madamba
(74) *Attorney, Agent, or Firm* — Finnegan, Henderson, Farabow, Garrett & Dunner, LLP

(57) ABSTRACT

Methods and systems for providing multipath connectivity intelligence is disclosed. The system may include one or more processors; and a memory storing instructions that cause the one or more processors to perform the steps comprising: connecting, by an intelligence interface, an agent to an intelligence service, transmitting, by the intelligence interface, information associated with the agent to the intelligence service, and receiving, by the intelligence interface, one or more connectivity options associated with the agent from the intelligence service. The agent may be a logical entity comprising one or more functions configured to manage multipath connectivity, and the one or more connectivity options may be used by one or more networks or one or more device functions for multipath management and scheduling.

29 Claims, 9 Drawing Sheets

SYSTEMS AND METHODS FOR PROVIDING MULTIPATH CONNECTIVITY INTELLIGENCE

CROSS-REFERENCE TO RELATED APPLICATIONS

This application claims the benefit of U.S. Provisional Application Ser. No. 63/310,283, filed on Feb. 15, 2022, the disclosure of which is hereby incorporated by reference in its entirety.

TECHNICAL FIELD

The present disclosure relates to inventive techniques for providing connectivity intelligence and, more particularly, to methods, systems, and computer-readable media for providing multipath connectivity intelligence to one or more network or device functions so that they can avail of the intelligence information for multipath management and scheduling. Multipath connectivity here refers to the availability of multiple connectivity options that establish simultaneous multiple paths for sending and receiving data from a device over multiple networks to an end point such as a server application in the internet or in the enterprise cloud. While the description provided in this application pertains primarily to wireless connectivity options, i.e. sending and receiving data over wireless networks, the concept of providing multipath connectivity intelligence extends to wired connectivity options too.

BACKGROUND

Many applications today, including applications that run on user devices such as phones, smartphones, tablets, smart tablets, laptops, computers, Internet of Things (IoT) devices, or the like, have multiple wireless connectivity options to connect to server applications in the Cloud or Edge. For example, application traffic has the option to use multiple connectivity options, including a Wi-Fi connection, a Citizens' Broadband Radio Service (CBRS) private network connection, a cellular operator network connection, and connections using 6-GHz (Wi-Fi-6E) networks, 5G mmWave networks, or the like. These connectivity options, however, are typically not coordinated. For instance, Wi-Fi and cellular networks are completely independent and owned and operated by different entities.

Having multiple connectivity options available provides significant opportunity to improve application performance in terms of throughput, latency, reliability, and other metrics that impact user experience, energy efficiency, and cost efficiency. However, conventional applications typically select connectivity options merely based on availability. For example, some connectivity options, such as the Wi-Fi connection, are chosen merely because they are available or are free to use. Therefore, there is a need to provide an improved, coordinated method of choosing connectivity options. For example, there is a need for providing multipath connectivity intelligence information to one or more network or device functions or applications so that they can intelligently steer, switch, or split between available connectivity options for sending their traffic needs and, thus, improve performance and user experience. Such multipath connectivity intelligence can be static or dynamic.

Moreover, present applications designed for multipath connectivity must choose an appropriate connectivity option based on traffic behavior measurements, such as retransmissions or packet loss. However, because choosing an appropriate connectivity option based on determined traffic behavior measurements is a reactive approach, there may be a time delay in choosing the connectivity option and, thus, may be a sub-optimal approach since applications and devices may not have full real-time dynamic or apriori static information regarding the available connectivity options, which can lead to lower performance for the applications. Accordingly, there is a need for a faster and smarter method of proactively providing intelligence around available multipath connectivity options such that applications can quickly adjust their use of different connectivity options with minimal performance impact.

SUMMARY

One aspect of the present disclosure is directed to a method for providing multipath connectivity intelligence. The method may comprise connecting, by an intelligence interface, an agent to an intelligence service, transmitting, by the intelligence interface, information associated with the agent to the intelligence service, and receiving, by the intelligence interface, one or more connectivity options associated with the agent from the intelligence service. The agent may be a logical entity comprising one or more functions configured to manage multipath connectivity. The one or more connectivity options may be used by one or more networks or one or more device functions for multipath management and scheduling.

In some embodiments, the method may further comprise receiving information associated with the one or more connectivity options from the intelligence service. The information may comprise at least one of availability of the one or more connectivity options, quality of the one or more connectivity options, energy efficiency of the one or more connectivity options, security of the one or more connectivity options, or cost of the one or more connectivity options. In some embodiments, the intelligence service may be configured to transmit the one or more connectivity options via a plurality of application programming interfaces deployed in the cloud and the edge. In other embodiments, the intelligence service may be deployed in at least one of the cloud or the edge. In some embodiments, the intelligence service may be configured to determine the one or more connectivity options based on a connectivity map generated by a connectivity map service application programming interface.

In some embodiments, the intelligence interface may comprise one or more functions configured to facilitate communication between the agent and the intelligence service. The one or more functions may comprise at least one of message parsing, message aggregation, or message translation. In some embodiments, the communication between the agent and the intelligence service may be encrypted. In other embodiments, the agent may comprise a network management function and a connectivity management function. In some embodiments, the method may further comprise receiving, by the intelligence interface, performance information associated with the one or more connectivity options for the network management function from the intelligence service, and receiving, by the intelligence interface, availability information associated with the one or more connectivity options for the connectivity management function from the intelligence service. In some embodiments, at least one of the network management function or the connectivity management function may be configured to transmit performance measurements to the intelligence service via the intelligence interface. In some embodiments, the intelligence service may be configured to update the one or more connectivity options based on the performance measurements received from at least one of the network management function or the connectivity management function.

In some embodiments, the intelligence service may be configured to predict, using one or more machine learning algorithms, the one or more connectivity options. The intelligence service may be further configured to predict, using the one or more machine learning algorithms, at least one of best connectivity options for different times of a day, best connectivity options as a function of predicted trajectory of a device associated with the agent, or best connectivity options for predicted traffic generated by the device. In some embodiments, the intelligence service may be configured to train the one or more machine learning algorithms using the information associated with the agent. The information associated with the agent may comprise at least one of location information, security preference information, or connectivity performance requirement of one or more devices associated with the agent.

Another aspect of the present disclosure is directed to a system for providing multipath connectivity intelligence. The system may comprise one or more processors, and a memory storing instructions that, when executed by the one or more processors, cause the one or more processors to perform the steps comprising: connecting, by an intelligence interface, an agent to an intelligence service, transmitting, by the intelligence interface, information associated with the agent to the intelligence service, and receiving, by the intelligence interface, one or more connectivity options associated with the agent from the intelligence service. The agent may be a logical entity comprising one or more functions configured to manage multipath connectivity. The one or more connectivity options may be used by one or more networks or one or more device functions for multipath management and scheduling.

In some embodiments, the instructions, when executed by the one or more processors, may cause the one or more processors to receive information associated with the one or more connectivity options from the intelligence service. The information may comprise at least one of availability of the one or more connectivity options, quality of the one or more connectivity options, energy efficiency of the one or more connectivity options, security of the one or more connectivity options, or cost of the one or more connectivity options. In some embodiments, the intelligence service may be configured to transmit the one or more connectivity options via a plurality of application programming interfaces deployed in the cloud and the edge. In other embodiments, the intelligence service may be deployed in at least one of the cloud or the edge. In yet another embodiment, the intelligence service may be configured to determine the one or more connectivity options based on a connectivity map generated by a connectivity map service application programming interface.

In some embodiments, the intelligence interface may comprise one or more functions configured to facilitate communication between the agent and the intelligence service. The one or more functions may comprise at least one of message parsing, message aggregation, or message translation. In some embodiments, the communication between the agent and the intelligence service may be encrypted. In some embodiments, the agent may comprise a network management function and a connectivity management function. The instructions, when executed by the one or more processors, cause the one or more processors to: receive, by the intelligence interface, performance information associated with the one or more connectivity options for the network management function from the intelligence service, and receive, by the intelligence interface, availability information associated with the one or more connectivity options for the connectivity management function from the intelligence service. In some embodiments, at least one of the network management function or the connectivity management function may be configured to transmit performance measurements to the intelligence service via the intelligence interface. In other embodiments, the intelligence service may be configured to update the one or more connectivity options based on the performance measurements received from at least one of the network management function or the connectivity management function.

In some embodiments, the intelligence service may be configured to predict, using one or more machine learning algorithms, the one or more connectivity options. The intelligence service may be further configured to predict, using the one or more machine learning algorithms, at least one of best connectivity options for different times of a day, best connectivity options as a function of predicted trajectory of a device associated with the agent, or best connectivity options for predicted traffic generated by the device. In some embodiments, the intelligence service may be configured to train the one or more machine learning algorithms using the information associated with the agent. The information associated with the agent may comprise at least one of location information, security preference information, or connectivity performance requirement of one or more devices associated with the agent.

Yet another aspect of the present disclosure is directed to a non-transitory computer-readable medium embodying program code for providing intelligence. The program code may comprise a set of instructions, stored on the computer readable medium, that when executed by a processor, cause the processor to perform the operations of: connecting, by an intelligence interface, an agent to an intelligence service, transmitting, by the intelligence interface, information associated with the agent to the intelligence service, and receiving, by the intelligence interface, one or more connectivity options associated with the agent from the intelligence service. The agent may be a logical entity comprising one or more functions configured to manage multipath connectivity. In addition, the one or more connectivity options may be used by one or more networks or one or more device functions for multipath management and scheduling.

BRIEF DESCRIPTION OF THE DRAWINGS

The accompanying drawings, which are incorporated in and constitute a part of this disclosure, illustrate various exemplary disclosed embodiments. In the drawings.

DETAILED DESCRIPTION OF DISCLOSED EMBODIMENTS

Figure 1:
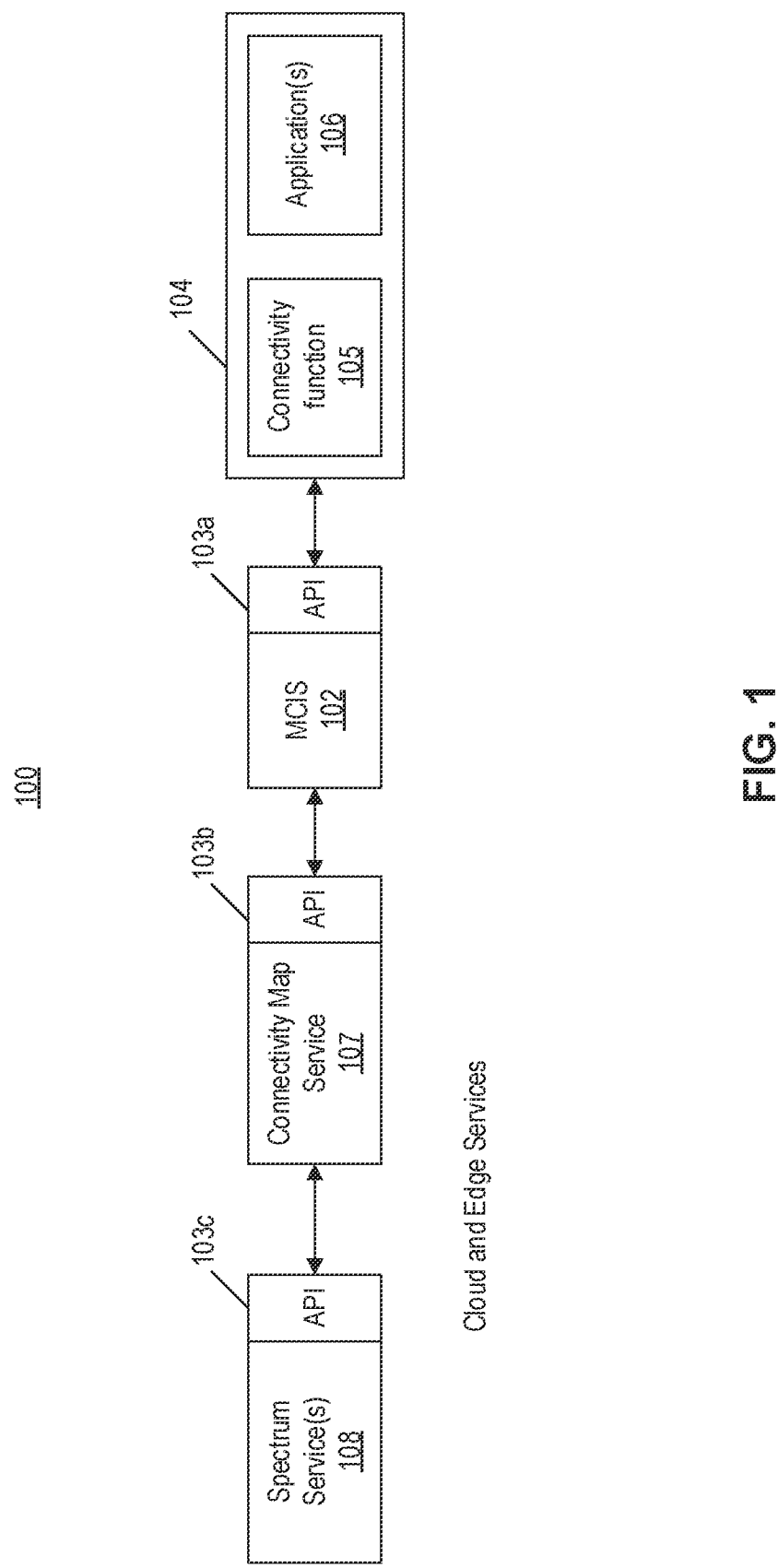
FIG. 1 is a schematic diagram illustrating an exemplary system for providing multipath connectivity intelligence using a multipath connectivity intelligence service (MCIS), consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

The present disclosure is directed to providing multipath connectivity intelligence (also referred to as "MCI") to one or more network or device functions or applications. As used herein, multipath connectivity intelligence may refer to intelligence around the available connectivity options that may be determined using one or more inputs from one or more different resources, such as a connectivity map from a connectivity map service. For example, multipath connectivity intelligence may refer to intelligence associated with steering, switching, or splitting between available connectivity options to achieve better performance. Multipath connectivity intelligence can be provided by a multipath connectivity intelligence service (also referred to as "MCIS") to facilitate multipath management and scheduling. Exemplary network or device functions that may benefit from multipath connectivity intelligence include, but are not limited to, Network Management Function, Connectivity Management Service function on a user device or IoT device, Session Management Function (SMF) capable of Access Traffic Steering, Switching and Splitting (ATSSS) functionality in a 5G network, and/or ATSSS handling functionality in a $3^{rd}$ Generation Partnership Program (3GPP) user equipment (UE). One or more of these network or device functions that are responsible for network and connectivity management may avail of multipath connectivity intelligence provided by MCIS to better steer, switch, or split between available connectivity options and achieve better performance.

In some embodiments, as discussed in more detail below, some network or device functions may need to be enhanced or may need one or more additional interfaces, functions, or services to communicate with the MCIS. The one or more additional functions that can interface with the MCIS to provide multipath connectivity management functionality may be referred to as a multipath connectivity agent (also referred to as "MCA"). By way of example, a multipath connectivity agent may comprise a logical entity configured to interface with the MCIS. The connectivity options, as used herein, may refer to connections across spectrum bands and across different technologies, such as CBRS connectivity over CBRS spectrum or WiFi-6E connectivity over AFC spectrum.

Figure 2:
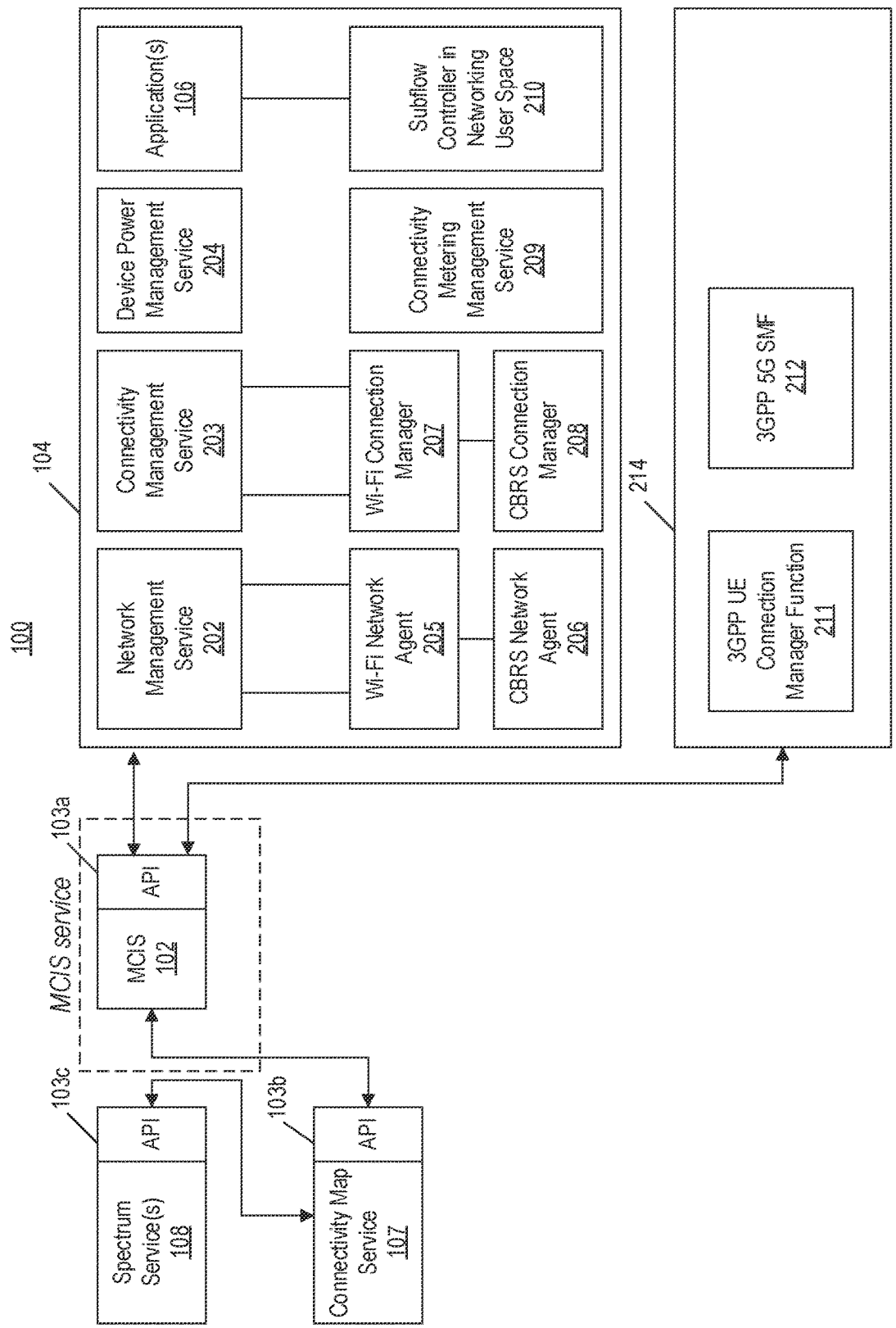
FIG. 2 is a detailed schematic diagram of the exemplary system of FIG. 1, consistent with disclosed embodiments.

FIGS. 1 and 2 are schematic diagrams illustrating an exemplary system 100 for providing multipath connectivity intelligence using a MCIS, consistent with disclosed embodiments. System 100 may comprise a MCIS 102 configured to provide multipath connectivity intelligence to one or more consumers 104 of such intelligence. In some embodiments, consumer(s) 104 may comprise one or more user devices capable of supporting multiple connectivity options, such as phones, tablets, laptops, Internet of Things (IoT) devices, or the like. As shown in FIG. 1, consumer(s) 104 may comprise one or more user devices configured to support various functions and/or applications, such as connectivity function 105 and one or more applications 106 needing multipath support. Multipath connectivity intelligence provided by MCIS 102 may allow consumer(s) 104 flexibility in using multiple connectivity options and links for the function(s) or application(s) the consumer(s) 104 of multipath connectivity intelligence supports, such as connectivity function 105 and one or more applications 106. For example, consumer(s) 104 may switch between multiple connectivity links for the one or more applications that consumer(s) 104 support for resiliency or provide simultaneous multiple connectivity links to smart application(s) to steer its traffic and optimize data transport performance.

In some embodiments, consumer(s) 104 of multipath connectivity intelligence, such as one or more user devices, may be configured to support additional functions. For example, referring now to FIG. 2, one or more user devices may be configured to support additional functions, such as Network Management Service 202, Connectivity Management Service 203, Device Power Management Service 204, one or more applications 106 needing multipath support (as similarly shown in FIG. 1), and Connectivity Metering Management Service 209. Functions of the Connectivity Management Service 203 may be similar to the connectivity function 105 of FIG. 1. In some embodiments, Network Management Service 206 and Connectivity Management Service 207 may be configured to use multipath connectivity intelligence to optimize application traffic routing over multiple connectivity links. In addition, Device Power Management Service 208 may be configured to use multipath connectivity intelligence to optimize battery power by choosing the most energy efficient network interface. Moreover, Connectivity Metering Management Service 209 may be configured to use multipath connectivity intelligence to optimize connectivity metering or cost of data transport by selecting the most cost-effective network interface.

In some embodiments, one or more functions or services supported by consumer(s) 104, such as one or more user devices, may be enhanced to communicate with MCIS 102. The one or more functions or services may individually subscribe to MCIS 102 or as a logical entity. In other embodiments, new entities can be created on devices or networks to communicate with MCIS 102 to obtain connectivity intelligence. By way of example, as shown in FIG. 2, Network Management Service 202 may be enhanced to further comprise a Wi-Fi Network Agent 205 and CBRS Network Agent 206 to communicate with MCIS 102 and receive connectivity intelligence. Connectivity Management Service 203 may be enhanced to further comprise a Wi-Fi Connection Manager 207 and CBRS Connection Manager 208 to communicate with MCIS 102 and receive connectivity intelligence.

In other embodiments, as shown in FIG. 2, consumer(s) 104 may further comprise one or more 3GPP networks and/or UEs 214 capable of Access Traffic Steering, Switching and Splitting (ATSSS). ATSSS may allow traffic steering across multiple accesses at a finer granularity than, for example, a Protocol Data Unit (PDU) session. One or more ATSSS-capable 3GPP networks and/or UEs 214 may comprise a 3GPP UE Connection Manager Function 211 that supports ATSSS function in a 3GPP UE and/or a 3GPP 5G Session Management Function (SMF) 212 that supports ATSSS function in 3GPP 5G Core. In some embodiments, SMF 212 may be modified or enhanced to communicate with MCIS 102. Within the 5G Core, control of ATSSS may be handled by a Policy Control Function (PCF), which provides ATSSS rules to both the UE and the SMF based on service provider policy. ATSSS may introduce Multi-Access PDU access, which may be a PDU session for which the data traffic can be served over one or more concurrent accesses such as 3GPP access, trusted non-3GPP access, and/or untrusted non-3GPP access. A PDU session may provide end-to-end user plane connectivity between a UE and a specific Data Network through a User Plane Function and may support one or more quality of service (QoS) flows.

As shown in FIGS. 1 and 2, the MCIS 102 may provide connectivity intelligence via one or more APIs 103*a*, 103*b*, and/or 103*c* that are available in the Cloud and the Edge. The MCIS 102 may be deployed in the Cloud, in the Edge, or in a hybrid manner. In some embodiments, the connectivity intelligence information from the MCIS 102 may be obtained either through a push mechanism or a pull mechanism. For example, the connectivity intelligence information may be provided in response to demand for connectivity intelligence information (i.e., pull mechanism), or the connectivity intelligence information may be provided in anticipation of future demand for connectivity intelligence information (i.e., push mechanism).

In some embodiments, the MCIS 102 may use one or more inputs from one or more different resources to create intelligence around the available connectivity options and provide connectivity intelligence. By way of example, the MCIS 102 may use a connectivity map service 107 to create intelligence around the available connectivity options. Connectivity map service 107 may be configured to create and maintain a dynamic connectivity map for each access point (AP) in a wireless access network and generate intelligence information around connectivity options that are available real-time or near real-time for every AP in the wireless access network. In some embodiments, the connectivity map service 107 may be configured to provide additional intelligence information, such as spectrum coverage, spectrum capacity, quality of service (QoS) associated with the spectrum, spectrum availability in time and location, spectrum loading, spectrum cost, spectrum reliability, features supported by the spectrum, standards supported by the spectrum, security requirement associated with the spectrum, or authentication requirement associated with the spectrum. In some embodiments, the connectivity map service 107 may also include information pertaining to licensed spectrum. The MCIS 102 may use the connectivity map service 107 via a secure and scalable access to create intelligence around the available connectivity options.

In some embodiments, MCIS 102 may use one or more inputs from spectrum services 108 to create intelligence around the available connectivity options. By way of example, MCIS 102 may use inputs from one or more spectrum services 108, such as information related to CBRS-connection or Automated Frequency Coordination (AFC) system connection, to provide connectivity intelligence information. Connectivity intelligence information may comprise qualified information related to the availability and the quality of connectivity options that are available to one or more network or device functions or applications traffic. In other embodiments, MCIS 102 may be configured to handle exchanges with multiple engines in devices and/or networks and may further be configured to use analytics and machine learning algorithm(s) to fine-tune connectivity intelligence.

Figure 3:
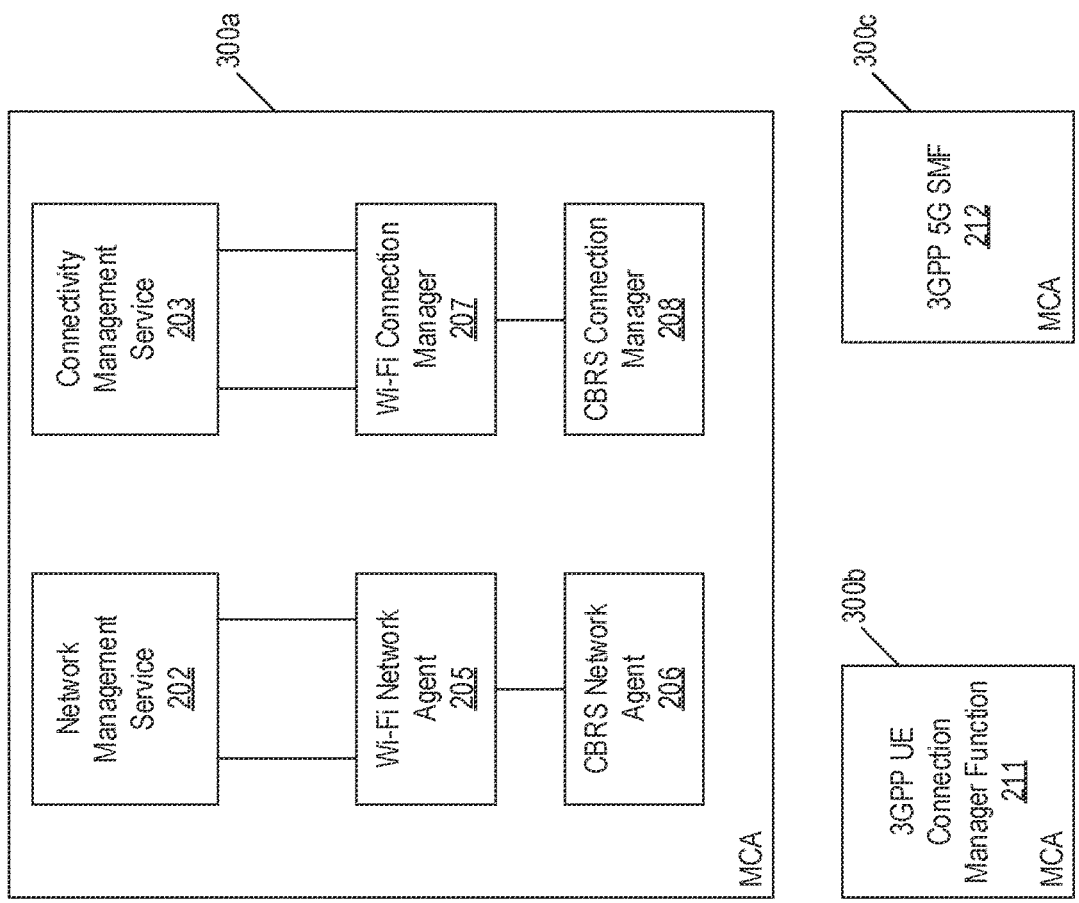
FIG. 3 is a schematic diagram of exemplary multipath connectivity agents, consistent with disclosed embodiments.

In some embodiments, the connectivity intelligence may be provided through the multipath connectivity agents or MCAs, such as MCAs 300*a-c* of FIG. 3. In some embodiments, the connectivity intelligence may be static. For example, the connectivity intelligence may be provided to a multipath connectivity agent when the MCIS receives a request for the connectivity intelligence information. In other embodiments, the connectivity intelligence may be dynamic. For example, the MCIS 102 may provide dynamic connectivity intelligence information about the availability or unavailability of one or more connectivity options, such as a CBRS-based connection, to a multipath connectivity agent which then may proactively make such information available to one or more network or device functions or applications that may be interested in this connectivity option for their traffic needs, such as the function(s), service(s), and application(s) described above with respect to FIGS. 1 and 2. By way of example, the MCIS 102 may inform a multipath connectivity agent that a CBRS link is about to be impacted, for instance due to Dynamic Protection Area (DPA) activation that may require the CBSD or Radio to switch channels. Instead of determining through transmission control protocol (TCP) packet loss or retransmission that the CBRS link is about to be impacted, an application upon receiving such information from the multipath connectivity agent can proactively steer user traffic away from the CBRS-based connection.

As discussed above, connectivity intelligence may be provided through multipath connectivity agents or MCAs. FIG. 3 is a schematic diagram of exemplary multipath connectivity agents 300*a-c*, consistent with disclosed embodiments. Multipath connectivity agents 300*a-c* may each be a logical entity comprising one or more functions configured to provide multipath connectivity management and configured to communicate with the MCIS deployed in the Cloud and/or Edge, such as MCIS 102 of FIGS. 1 and 2. By way of example, multipath connectivity agent 300*a* may include Network Management Service 202 and/or Connectivity Management Service 203 on a user device. In some embodiments, multipath connectivity agent 300*b* may include a Connection Manager Function 211 capable of ATSSS in a 3GPP UE.

In other embodiments, multipath connectivity agent 300*c* may include a Session Management Function (SMF) 212 in an ATSSS-capable 3GPP 5G Core Network. In some embodiments, Network Management Service 202, Connectivity Management Service 203, Connection Manager Function 211, and/or SMF function 212 may need to be modified or enhanced to handle communications with multipath connectivity intelligence 102. In other embodiments, Network Management Service 202, Connectivity Management Service 203, Connection Manager Function 211, and/or SMF function 212 may individually subscribe to multipath connectivity intelligence 102 or as a logical combined entity. In yet another embodiment, new entities may be created on devices or networks to communicate with multipath connectivity intelligence. For example, as discussed above, Network Management Service 202 may be enhanced to further comprise a Wi-Fi Network Agent 205 and CBRS Network Agent 206 to communicate with MCIS 102 and receive connectivity intelligence. Connectivity Management Service 203 may be enhanced to further comprise a Wi-Fi Connection Manager 207 and CBRS Connection Manager 208 to communicate with MCIS 102 and receive connectivity intelligence.

Figure 4:
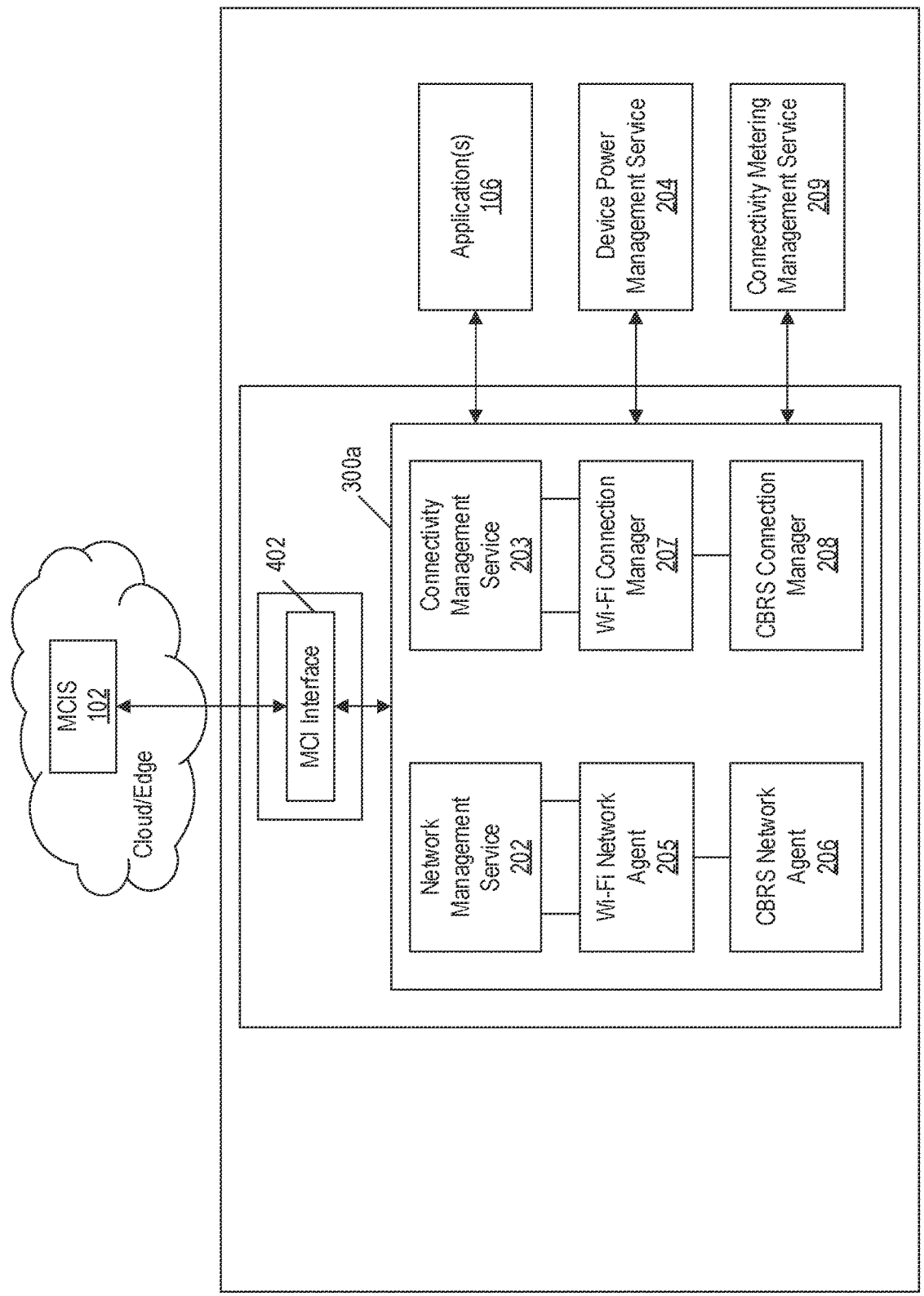
FIG. 4 is a schematic diagram of an exemplary multipath connectivity agent interfacing with a MCIS, consistent with disclosed embodiments.

FIG. 4 illustrates a schematic diagram of an exemplary multipath connectivity agent 300a interfacing with a MCIS 102, consistent with disclosed embodiments. As shown in FIG. 4, multipath connectivity agent 300a may be configured to communicate with MCIS 102 through a multipath connectivity intelligence interface 402. Multipath connectivity intelligence interface 402 may comprise a software function that handles communication between different components comprising the multipath connectivity agent 300a and MCIS 102. In some embodiments, multipath connectivity intelligence interface 402 may be configured to support functions such as message parsing, message aggregation, and/or message translation to enable device function(s) such as Network Management Service 202 and Connectivity Management Service 203 to communicate with MCIS 102 in an optimized way.

In some embodiments, multipath connectivity intelligence interface 402 provides a common interface between functions, such as Network Management Service 202 and Connectivity Management Service 203, and MCIS 102. Network Management Service 202 and Connectivity Management Service 203 may obtain different types of connectivity intelligence from MCIS 102 via multipath connectivity intelligence interface 402. For example, the connectivity intelligence that Wi-Fi Network Agent 205 and CBRS Network Agent 206 receives from MCIS 102 may comprise information related to the performance of the available connectivity options, such as Wi-Fi and CBRS, respectively. On the other hand, the connectivity intelligence that Wi-Fi Connection Manager 207 and CBRS Connection Manager 208 receives from MCIS 102 may comprise information related to the availability of the connectivity options, such as Wi-Fi and CBRS, respectively.

In some embodiments, functions such as Network Management Service 202 and Connectivity Management Service 203 may transmit performance measurements or metrics to the MCIS 102 via the multipath connectivity intelligence interface 402. Such performance measurements or metrics sent to the MCIS 102 may comprise measurements taken by the one or more user devices pertaining to ongoing traffic transfer.

Alternatively, performance measurements or metrics sent to the MCIS 102 may comprise measurements the one or more user devices took periodically or on demand by sending test traffic to one or more connectivity options to determine the quality of such connectivity option using a separate mechanism, such as Internet test tools like InternetFrog. MCIS 102 may use performance measurements or metrics received to send, in real-time, near real-time, or non real-time, appropriate connectivity guidance to one or more network or device functions, services, or applications. In some embodiments, MCIS 102 may use performance measurements or metrics received to improve its multipath connectivity intelligence by analyzing the performance measurements or metrics or using the measurements or metrics to train one or more machine learning algorithms.

As shown in FIG. 4, multipath connectivity agent 300a may transmit connectivity intelligence to one or more functions or services on a user device, such as application(s) 106 needing multipath support, Device Power Management Service 204, and/or Connectivity Metering Management Service 209. As discussed above, Device Power Management Service 208 may be configured to use multipath connectivity intelligence to optimize battery power by choosing the most energy efficient network interface. Additionally, Connectivity Metering Management Service 209 may be configured to use multipath connectivity intelligence to optimize connectivity metering or cost of data transport by selecting the most cost-effective network interface. Application(s) 106 needing multipath support may be configured to use multipath connectivity intelligence to intelligently steer, switch, or split between available connectivity options for sending its traffic needs and, thus, improve performance and user experience while using the application(s) 106.

Figure 5:
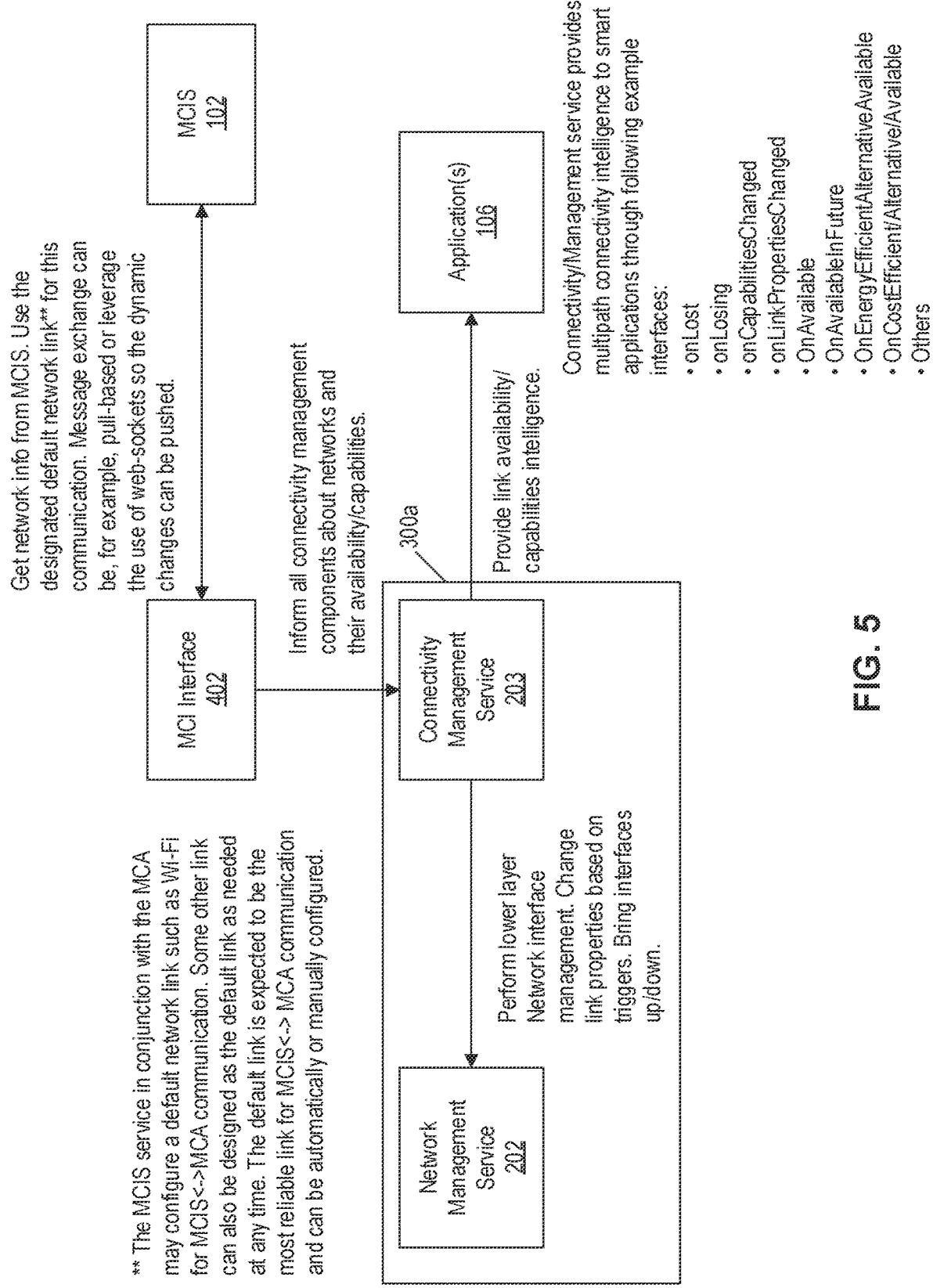
FIG. 5 is a schematic diagram of an exemplary MCIS in communication with device functions via a multipath connectivity intelligence interface, consistent with disclosed embodiments.
Figure 6:
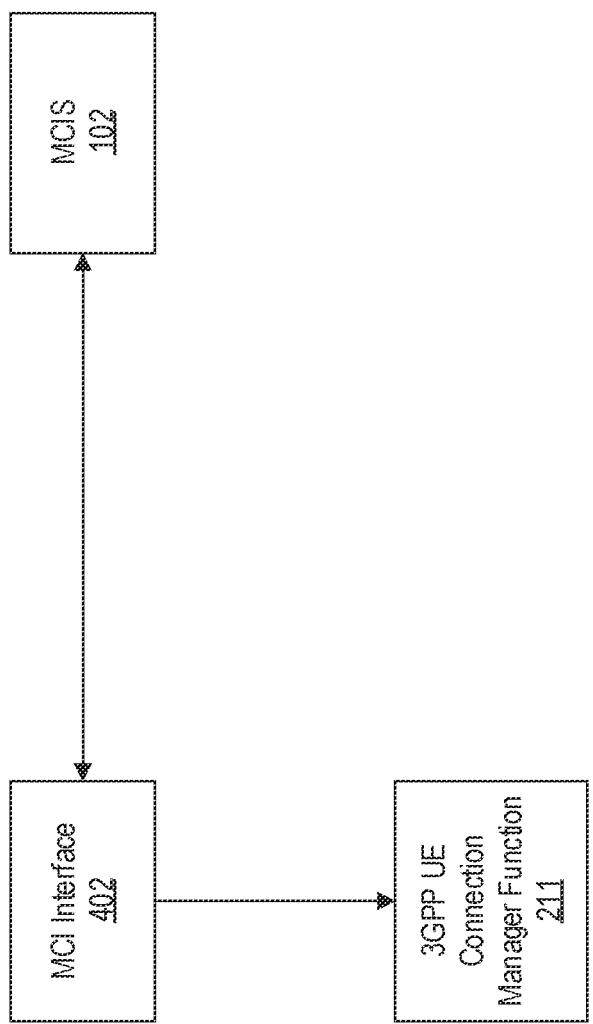
FIG. 6 is a schematic diagram of an exemplary MCIS in communication with a 3GPP UE Connection Manager Function via a multipath connectivity intelligence interface, consistent with disclosed embodiments.
Figure 7:
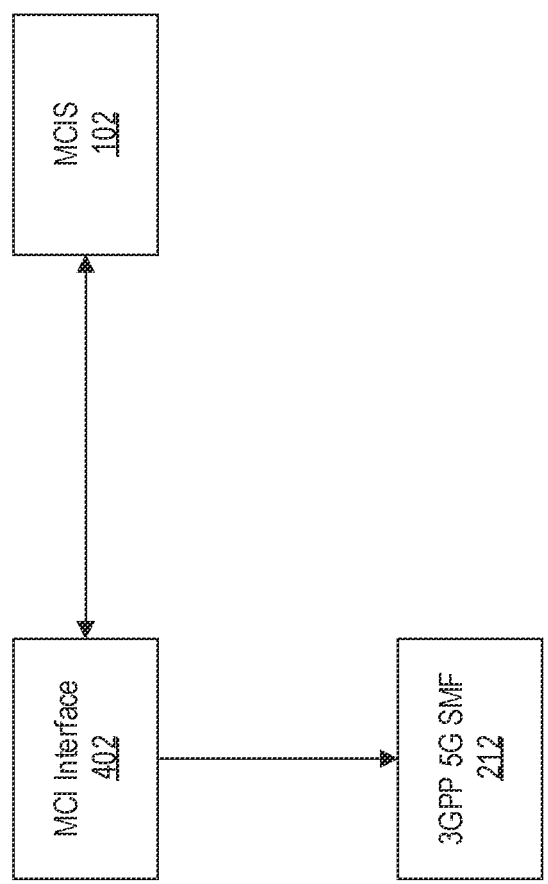
FIG. 7 is a schematic diagram of an exemplary MCIS in communication with a 3GPP 5G Session Management Function via a multipath connectivity intelligence interface, consistent with disclosed embodiments.

FIGS. 5-7 are schematic diagrams of an exemplary MCIS in communication with various consumers of connectivity intelligence, via a multipath connectivity intelligence interface, consistent with disclosed embodiments. By way of example, FIG. 5 illustrates an exemplary flow of information between MCIS 102 and one or more functions, services, or applications on a user device. As shown in FIG. 5, one or more functions, services, or applications such as Network Management Service 202, Connectivity Management Service 203, and/or application(s) 106 needing multipath support may receive connectivity intelligence from MCIS 102 via multipath connectivity intelligence interface 402. FIG. 6 illustrates an exemplary flow of information between MCIS 102 and 3GPP UE Connection Manager Function 211 to inform 3GPP UE, via multipath connectivity intelligence interface 402, of the availability of a new access network link. Additionally, FIG. 7 illustrates an exemplary flow of information between MCIS 102 and 3GPP 5G SMF 212 to inform 3GPP5G SMF 212 of the unavailability of an existing access network link.

Referring to FIG. 5, in some embodiments, the MCIS 102 in conjunction with multipath connectivity agent 300a, comprising Network Management Service 202 and Connectivity Management Service 203, may configure a default network link such as Wi-Fi to allow communication between the MCIS 102 and multipath connectivity agent 300a. In other embodiments, another connectivity link can be designed as a default link as needed at any time. The default network link may be the most reliable link for communication between the MCIS 102 and multipath connectivity agent 300a and can be automatically or manually configured. To allow information exchange, network information including connectivity intelligence may be obtained from MCIS 102 using the default network link. Connectivity intelligence may be obtained by a push mechanism or a pull mechanism.

In some embodiments, the use of web-sockets may be leveraged to obtain dynamic connectivity intelligence information by a push mechanism from MCIS 102. MCIS 102 may communicate connectivity intelligence, such as availability information and performance/capabilities information of each available connectivity option, via multipath connectivity interface 402 to all connectivity management components of a user device, such as Connectivity Management Service 203 and Network Management Service 202. In some embodiments, based on the connectivity intelligence, Network Management Service 202 may reduce layer network interface management, change network link properties based on one or more triggers, and/or move interfaces up/down. Connectivity Management Service 203 and/or Network Management Service 202 may also be configured to provide connectivity intelligence related to availability and performance of available connectivity options to one or more application(s) 106 needing multipath support.

Referring now to FIG. 6, the MCIS 102 in conjunction with a multipath connectivity agent, such as 3GPP UE Connection Manager Function 211, may configure a default network link such as Wi-Fi to allow communication between the MCIS 102 and a multipath connectivity agent 211. In other embodiments, another connectivity link can be designed as a default link as needed at any time. The default network link may be the most reliable link for communication between the MCIS 102 and a multipath connectivity agent 211 and can be automatically or manually configured. To allow information exchange, network information including connectivity intelligence may be obtained from MCIS 102 using the default network link. Connectivity intelligence may be obtained by a push mechanism or a pull mechanism. In some embodiments, the use of web-sockets may be leveraged to obtain dynamic connectivity intelligence information by a push mechanism from MCIS 102. MCIS 102 may communicate connectivity intelligence, such as availability information and performance/capabilities information of each available connectivity option, via multipath connectivity interface 402 to all connectivity management components. For example, MCIS 102 may communicate information related to the availability of a new 3GPP or non-3GPP network access link to 3GPP UE Connection Manager Function 211. Based on the connectivity intelligence, UE may initiate a UE-requested Protocol Data Unit (PDU) session establishment procedure over the new 3GPP access or the non-3GPP network access link.

Referring now to FIG. 7, the MCIS 102 in conjunction with multipath connectivity agent, such as 3GPP 5G SMF 212, may configure a default network link such as Wi-Fi to allow communication between the MCIS 102 and multipath connectivity agent. In other embodiments, another connectivity link can be designed as a default link as needed at any time. The default network link may be the most reliable link for communication between the MCIS 102 and multipath connectivity agent and can be automatically or manually configured. To allow information exchange, network information including connectivity intelligence may be obtained from MCIS 102 using the default network link. Connectivity intelligence may be obtained by a push mechanism or a pull mechanism. In some embodiments, the use of web-sockets may be leveraged to obtain dynamic connectivity intelligence information by a push mechanism from MCIS 102. Multipath connectivity intelligence service 102 may communicate connectivity intelligence, such as availability (or unavailability) information and performance/capabilities information of each available connectivity option, via multipath connectivity interface 402 to all connectivity management components. For example, MCIS 102 may communicate information related to an unavailability of a new 3GPP or non-3GPP network access link to 3GPP 5G SMF 212. Based on the connectivity intelligence, SMF 212 may initiate a network-requested PDU session release procedure over the new 3GPP access or the non-3GPP network access link by sending the PDU session release command to a UE.

MCIS 102 may be configured to make available various information pertaining to connectivity options available for application traffic to various multipath connectivity agents. By way of example, MCIS 102 may be configured to provide availability information. For each connectivity option, MCIS 102 may indicate whether it is available or unavailable, whether it will become unavailable in the future, and how long such unavailability may last. Where possible, MCIS 102 may also indicate the reason for the unavailability of any of the connectivity options, long-term or short-term statistics pertaining to unavailability of any of the connectivity options, and/or recommendations based on availability metrics for different connectivity options, such as an ordered list of connectivity options that reflects best-to-worst availability.

MCIS 102 may also be configured to provide quality information. For example, for each connectivity option, MCIS 102 may provide one or more quality related metrics, such as signal strength, capacity in terms of supportable data rate for downlink as well as uplink traffic, or the like. The quality metric may be an estimated quality indicator, could be a measured quality indicator, or could be a representative quality indicator such as a mean, median, minimum, maximum, or the like. In some embodiments, the quality metric may use the location of the user device that may be provided via a message exchange by the multipath connectivity agent on the user device or made available separately to the MCIS 102 as a configuration, configured manually or automatically. An exemplary message exchange between the MCIS 102 and a multipath connectivity agent providing a quality metric pertaining to a specific connectivity option is shown below:

```
▼ {
Required: frequencyRange,location,networkId,networkType
frequencyRange:            ▼ {
                               lowFrequency: number
                               highFrequency: number
                           }
location:                  ▼{
                               latitude: number
                               longitude: number
                           }
networkId:                 string
                           example: BSSID, PLMNID, etc.
network Type:              string
                           example: LTE/WIFI/CBRS etc.
▼}
Required: availability,cost,energy,frequencyRange,location,networkId,networkType,quality,security
frequencyRange:            ▼{
                               lowFrequency: number
                               highFrequency: number
                           }
```

-continued

```
location:              ▼ {
                           latitude: number
                           longitude: number
                       }
availability:          ▼{
                           startTime: string
                           endTime: string
                       }
quality:               ▼ {
                           qualityIndex: ▼number
                               An index in the range [0-1] providing high level guidance of
network quality to the customer
                           congestionlevel: number
                           maxBitRate: number
                       }
security:              ▼ {
                           supportedAlgorithms: ▼ [
                                                                   string
                           supportedCiphers:               ▼ [
                                                                   string
                           security Index:                         ▼number
                               An index in the range [0-1] providing high level guidance of
network security level to the customer
                           }
energy:                ▼{
                           energyIndex: ▼number
                               An index in the range [0-1] providing high level guidance of
network energy consumpion to the customer
                           energyPerBit:.                  ▼ [
                                                           ▼{
                                                           mean: number
                                                           max: number
                                                           min: number
                                                           }
                                                           ]
                           }
cost:                  ▼{
                           costIndex: ▼number
                               An index in the range [0-1] providing high level guidance of
network cost to the customer
                           costPerBit:                     ▼[
                                                           ▼ {
                                                           mean: number
                                                           max: number
                                                           min: number
                                                           }
                                                           ]
                           }
network.Id•            string
                       example: BSSID, PLMNID, etc.
network Type:              string
                       example: LTE/WIFI/CBRS etc
}
```

In some embodiments, MCIS 102 may provide a measured quality indicator to a multipath connectivity agent when, based on the location of the multipath connectivity agent device, MCIS 102 provides a measured quality indicator for a similar device from a geographically nearby location. When possible, MCIS 102 may also indicate the reason for degradation in quality of a connectivity option, long-term or short-term statistics pertaining to the quality metrics of any of the connectivity options, and/or recommendations based on quality metrics for different connectivity options, such as an ordered list of connectivity options that reflects best-to-worst quality. MCIS 102 may also indicate suitability for different kinds of applications. In some embodiments, the recommendations may be based on static or dynamically changing thresholds.

In other embodiments, MCIS 102 may be configured to provide energy efficiency information. For example, for each connectivity option, MCIS 102 may provide energy efficiency-related information pertaining to the connectivity option, such as an indicator of battery life consumption. Where possible, MCIS 102 may also indicate the reason for degradation of energy efficiency pertaining to any of the connectivity options, long-term or short-term statistics pertaining to the energy efficiency-related information of any of the connectivity options, and/or recommendations based on energy efficiency for different connectivity options, such as an ordered list of connectivity options that reflects best-to-worst energy efficiency. In some embodiments, MCIS 102 may also indicate suitability for different kinds of device capabilities.

In other embodiments, MCIS 102 may be configured to provide security information. For example, for each connectivity options, MCIS 102 may provide security-related information pertaining to the connectivity option, such as specific security mechanisms and details required by the connectivity option. MCIS 102 may also indicate the reason for any changes pertaining to security for any of the connectivity options, long-term or short-term statistics pertaining to security-related information of any of the connectivity options, and/or recommendations based on security information for different connectivity options, such as recommendations indicating suitability for different kinds of device capabilities.

In yet another embodiment, MCIS 102 may be configured to provide cost information. For example, for each connectivity option, MCIS 102 may provide cost-related information pertaining to the connectivity option, such as data rate charges. Where possible, MCIS 102 may also indicate the reason for any changes pertaining to cost for any of the connectivity options, long-term or short-term statistics pertaining to cost-related information of any of the connectivity options, and/or recommendations based on cost-related information for different connectivity options, such as an ordered list of connectivity options that reflects maximum-to-minimum cost.

The intelligence information provided by MCIS 102 may be provided as needed in an aggregated manner to optimize message exchange overhead between MCIS 102 and one or more multipath connectivity agents. In some embodiments, message exchange between MCIS 102 and one or more multipath connectivity agents can be designed to require encryption and authentication to manage identity and access for security purposes. In some embodiments, message exchange between MCIS 102 and one or more multipath connectivity agents can be made robust with acknowledgements (ACKs), retransmissions, or similar mechanisms to make sure the connectivity intelligence information is available to the one or more multipath connectivity agents reliably even with sub-optimal communication links.

Figure 8:
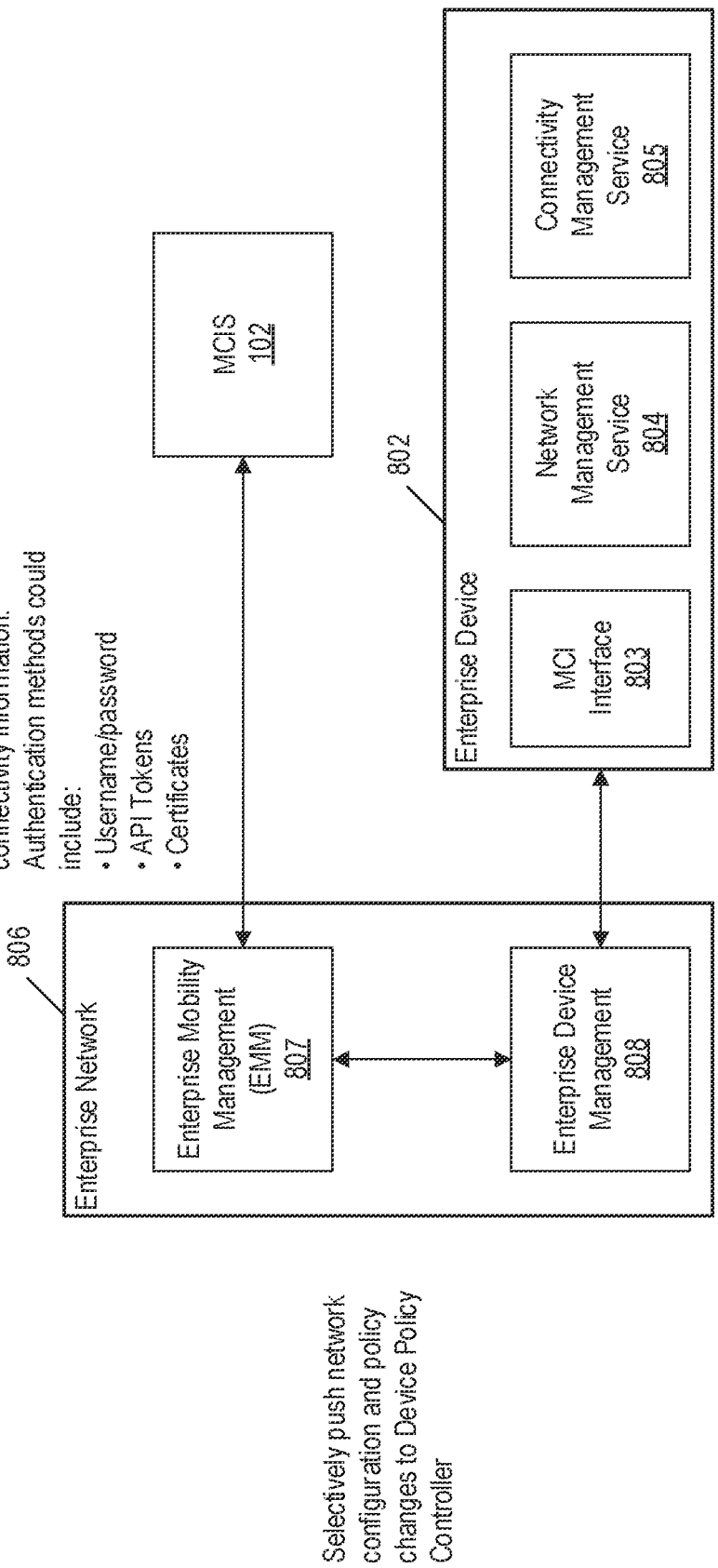
FIG. 8 is a schematic diagram of an exemplary MCIS in communication with one or more enterprise devices, consistent with disclosed embodiments.

In some embodiments, an enterprise user of the MCIS 102 may want its devices, such as employee or IoT devices, to connect securely and with optimized message aggregation/proxying to the MCIS 102 via its own mobility management or device management systems. FIG. 8 is a schematic diagram of an exemplary MCIS 102 in communication with one or more enterprise devices 802, consistent with disclosed embodiment. One or more enterprise devices 802 may be configured to support functions or services, such as Network Management Service 804 and Connectivity Management Service 805. One or more enterprise devices 802 may be configured to communicate with MCIS 102 via multipath connectivity interface 803.

As shown in FIG. 8, enterprise network services or functions such as Enterprise Mobility Management (EMM) 807 and Enterprise Device Management 808 may be enhanced to securely optimize communication between one or more enterprise devices 802 and MCIS 102. In tactical networks, such as for military applications for example, it may be required that the MCIS 102 is treated as an external un-trusted entity so that the MCIS 102 does not know what connectivity options are actually being used by the tactical applications. In such a case, the enterprise network entities, such as EMM 807 and/or Enterprise Device Management 808, may not provide any information back to the MCIS 102 as to which of its recommended connectivity options were in fact used by the application. In another example, obfuscation may be required where the application itself should not be made aware of what connectivity options are available or in use. In such a case, one or more enterprise devices 802 may ensure that such knowledge is not available to the application.

In some embodiments, MCIS 102 may be implemented following Cloud service architectural principles. For example, MCIS 102 may be implemented using a micro-services-based design may comprise Cloud APIs for information exchange, may comprise secure and private multi-tenancy, and/or may be deployed in a distributed fashion across different Cloud or Edge infrastructure (compute/storage) nodes to ensure low latency access, reliability, high-availability and privacy, as needed. In some embodiments, the information exchange between MCIS 102 and one or more multipath connectivity agents may require a certain level of "hysteresis" in how MCIS 102 advertises or recommends multipath connectivity changes to the one or more multipath connectivity agents or in how the one or more multipath connectivity agents reacts to such changes being recommended by MCIS 102. This may be important to avoid "thrashing" or "ping-ponging" between connectivity links, especially when the application traffic is being switched from one connectivity link to another.

In some embodiments, as part of its design, MCIS 102 may be configured to store multipath connectivity intelligence information for multiple connectivity options relevant to different multipath connectivity agent networks or devices for which it provides connectivity intelligence. MCIS 102 may also be configured to privately and securely store any relevant information pertaining to such networks or devices that may be useful for its operations such as location information, traffic support needs information, or the like.

With the access and ability to store information pertaining to multipath connectivity intelligence and devices and/or networks supported by multipath connectivity agents, MCIS 102 may be configured to train and implement one or more machine learning algorithms or models to improve multipath connectivity information and connectivity recommendations it provides to the one or more multipath connectivity agents it serves. For example, such machine learning algorithm(s) or model(s) could be used to provide predictive capability with respect to the best connectivity options for a particular network or device. Such predictive insights could include predicting the best connectivity options for a network or device for different times of the day, best connectivity options for a device as a function of its predicted trajectory, best connectivity options for predicted traffic generated by the device, or the like. By way of example, knowing the location of the device and associating it with an event center and knowing it coincides with the time of a live event at that event center, the one or more machine learning algorithm(s) or model(s) may provide intelligent connectivity recommendation for connectivity links with the best upload bandwidth, knowing that the device's traffic pattern indicates that the user does a lot of uploads when at a live event.

As discussed above, a working communication link for message exchange must be established to allow one or more multipath connectivity agents to communicate with MCIS 102. By way of example, if MCIS 102 wants to communicate intelligence information pertaining to a particular connectivity option, such as a CBRS private network link, to a multipath connectivity agent and if the multipath connectivity agent device does not have a CBRS private network connection established yet, MCIS 102 may need to have in place a working connectivity option other than an active CBRS private network link (e.g., an existing Wi-Fi connection) in order to communicate this intelligence information to the multipath connectivity agent. If the multipath connectivity agent device, for example, has multiple connectivity links active, it may be prudent for the communication to be done over the most reliable link.

In some embodiments, the multipath connectivity agent may be able to make that choice in choosing the most reliable link to communicate with MCIS 102. Accordingly, the multipath connectivity agent device may connect to MCIS 102 and avail of the connectivity intelligence for establishing its first network connection. In some embodiments, multipath connectivity agent may use a default connection, such as over Wi-Fi or any available reliable connection with, for example, the best signal strength, to connect to MCIS 102 at first, and then, switch to a more desirable connectivity option based on the connectivity intelligence information obtained from MCIS 102. Afterward, the multipath connectivity agent device may or may not maintain the default connection. In some embodiments, a multipath connectivity agent device may want to terminate one or more of its connectivity links to save battery. In such case, the multipath connectivity agent device may use connectivity intelligence obtained from MCIS 102 to determine which connectivity link it should terminate without compromising its ability to communicate with MCIS 102.

Figure 9:
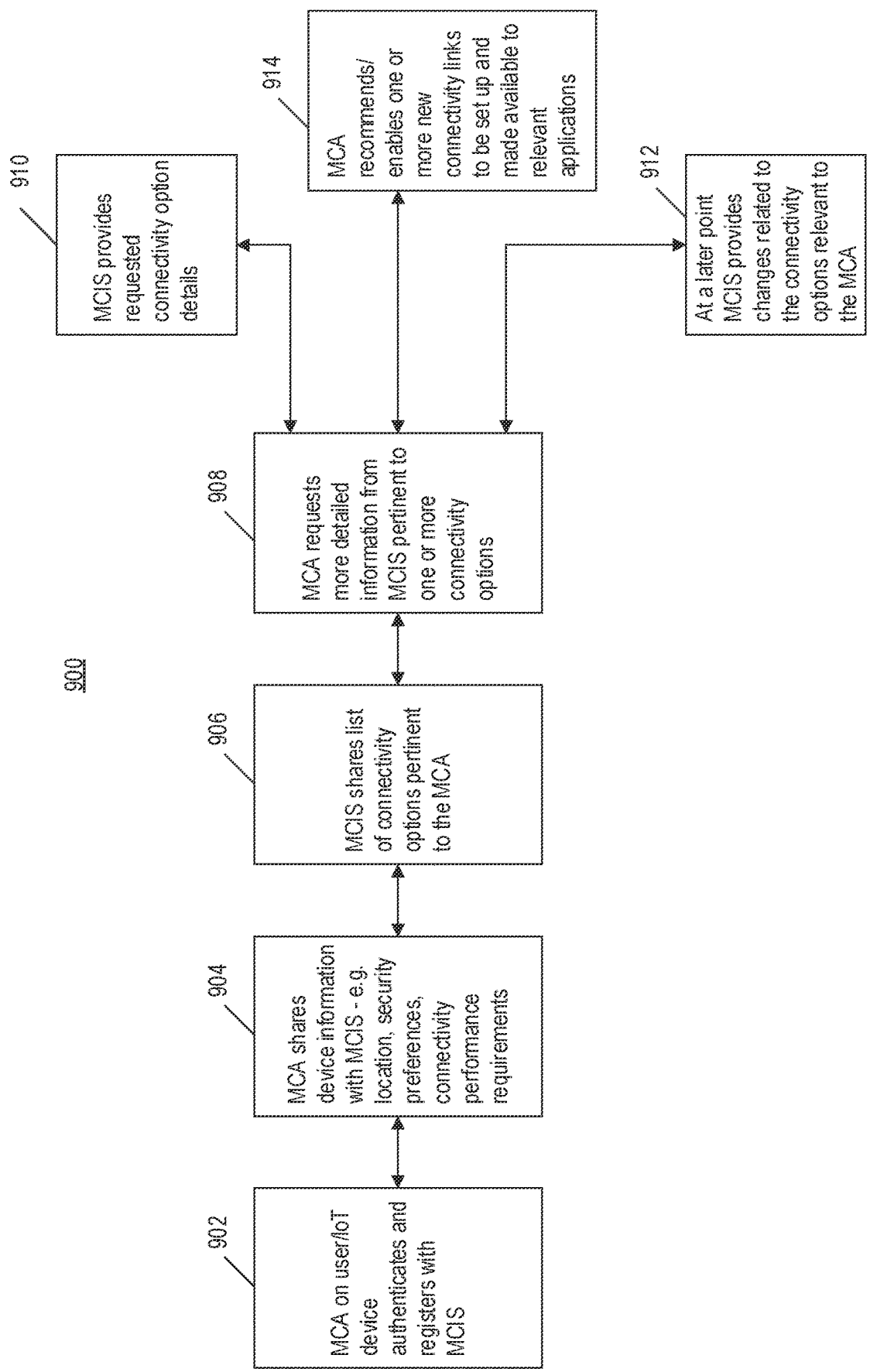
FIG. 9 is a flowchart illustrating an exemplary method for providing multipath connectivity intelligence from a MCIS via a multipath connectivity agent, consistent with disclosed embodiments.

FIG. 9 is a flowchart illustrating an exemplary method 900 for providing multipath connectivity intelligence from a MCIS 102 via a multipath connectivity agent, consistent with disclosed embodiments. At step 902, a multipath connectivity agent on, for example, a user device or IoT device may authenticate and register itself with the MCIS, such as MCIS 102. After authentication and registration, at step 904, the multipath connectivity agent may transmit its device information with MCIS 102. Such device information may comprise, for example, device location, device security preferences, device connectivity performance requirements, or the like. After receiving the device information from the multipath connectivity agent, at step 906, the MCIS may transmit a list of available connectivity options that are related to the multipath connectivity agent and its device. At step 908, the multipath connectivity agent may request additional information from the MCIS associated with one or more of the available connectivity options received from the MCIS. Additional information may comprise, for example, availability, quality, energy efficiency, security, and/or cost information associated with one or more of the available connectivity options. At step 910, the MCIS may transmit the additional information requested to the multipath connectivity agent. Additionally, or alternatively, at step 914, the multipath connectivity agent may recommend and/or enable one or more new connectivity links to be set up and made available to relevant application(s) in the device. Additionally, or alternatively, at step 912, the MCIS may proactively provide information related to changes to the one or more connectivity options that are relevant to the multipath connectivity agent and its device. For example, at a later point in time, the MCIS may proactively provide information related to other connectivity options that are going to become available, connectivity option(s) that are going to become unavailable, and/or changes related to the one or more connectivity options, to the multipath connectivity agent. The multipath connectivity agent may use this information to proactively recommend and/or enable one or more new connectivity links to be set up and made available to relevant application(s) in its device.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. For example, the exemplary disclosed embodiments are described in terms of providing multipath connectivity intelligence to steer, switch, and/or split between multiple available connectivity options across spectrum bands (e.g., CBRS connectivity options over CBRS spectrum and WiFi-6E connectivity options over AFC spectrum), although those skilled in the art will appreciate that the multipath connectivity intelligence may be used in other ways, consistent with the disclosed embodiments herein. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps, performing steps in parallel, and/or inserting or deleting steps. It is intended, therefore, that the specification and examples be considered as illustrative only, with a true scope and spirit being indicated by the following claims and their full scope of equivalents.

What is claimed is:

1. A method for providing multipath connectivity intelligence, the method comprising:
connecting, by an intelligence interface, an agent to an intelligence service, wherein the agent is a logical entity comprising one or more functions configured to manage multipath connectivity;
transmitting, by the intelligence interface, information associated with the agent to the intelligence service;
receiving, by the intelligence interface, one or more connectivity options associated with the agent from the intelligence service, wherein the multipath connectivity intelligence is based upon the availability and quality of connectivity options configured by machine learning algorithms and used to predict availability of the one or more connectivity options, wherein the connectivity options includes a frequency channel and wherein the availability pertains to frequency channel quality and, wherein the one or more connectivity options are used by one or more networks or one or more device functions for multipath management and scheduling.

2. The method of claim 1, further comprising receiving information associated with the one or more connectivity options from the intelligence service, wherein the information comprises at least one of availability of the one or more connectivity options, quality of the one or more connectivity options, energy efficiency of the one or more connectivity options, security of the one or more connectivity options, or cost of the one or more connectivity options.

3. The method of claim 1, wherein the intelligence service is configured to transmit the one or more connectivity options via a plurality of application programming interfaces deployed in the cloud and the edge.

4. The method of claim 1, wherein the intelligence service is deployed in at least one of the cloud or the edge.

5. The method of claim 1, wherein the intelligence service is configured to determine the one or more connectivity options based on a connectivity map generated by a connectivity map service application programming interface.

6. The method of claim 1, wherein the intelligence interface comprises one or more functions configured to facilitate communication between the agent and the intelligence service, wherein the one or more functions comprise at least one of message parsing, message aggregation, or message translation.

7. The method of claim 6, wherein the communication between the agent and the intelligence service is encrypted.

8. The method of claim 1, wherein the agent comprises a network management function and a connectivity management function, and wherein the method further comprises:
receiving, by the intelligence interface, performance information associated with the one or more connectivity options for the network management function from the intelligence service; and receiving, by the intelligence interface, availability information associated with the one or more connectivity options for the connectivity management function from the intelligence service.

9. The method of claim 8, wherein at least one of the network management function or the connectivity management function is configured to transmit performance measurements to the intelligence service via the intelligence interface.

10. The method of claim 9, wherein the intelligence service is configured to update the one or more connectivity options based on the performance measurements received from at least one of the network management function or the connectivity management function.

11. The method of claim 1, wherein the intelligence service is configured to train a machine learning model using the information associated with the agent.

12. The method of claim 11, wherein the information associated with the agent comprises at least one of location information, security preference information, or connectivity performance requirement of one or more devices associated with the agent.

13. A system for providing multipath connectivity intelligence, the system comprising:
one or more processors; and
a memory storing instructions that, when executed by the one or more processors, cause the one or more processors to perform the steps comprising:
connect, by an intelligence interface, an agent to an intelligence service, wherein the agent is a logical entity comprising one or more functions configured to manage multipath connectivity;
transmit, by the intelligence interface, information associated with the agent to the intelligence service;
receive, by the intelligence interface, one or more connectivity options associated with the agent from the intelligence service, wherein the multipath connectivity intelligence is based upon the availability and quality of connectivity options configured by machine learning algorithms and used to predict availability of the one or more connectivity options, wherein the connectivity options includes a frequency channel and wherein the availability pertains to frequency channel quality and,
wherein the one or more connectivity options are used by one or more networks or one or more device functions for multipath management and scheduling.

14. The system of claim 13, wherein the instructions, when executed by the one or more processors, cause the one or more processors to:
receive information associated with the one or more connectivity options from the intelligence service, wherein the information comprises at least one of availability of the one or more connectivity options, quality of the one or more connectivity options, energy efficiency of the one or more connectivity options, security of the one or more connectivity options, or cost of the one or more connectivity options.

15. The system of claim 13, wherein the intelligence service is configured to transmit the one or more connectivity options via a plurality of application programming interfaces deployed in the cloud and the edge.

16. The system of claim 13, wherein the intelligence service is deployed in at least one of the cloud or the edge.

17. The system of claim 13, wherein the intelligence service is configured to determine the one or more connectivity options based on a connectivity map generated by a connectivity map service application programming interface.

18. The system of claim 13, wherein the intelligence interface comprises one or more functions configured to facilitate communication between the agent and the intelligence service, wherein the one or more functions comprise at least one of message parsing, message aggregation, or message translation.

19. The system of claim 18, wherein the communication between the agent and the intelligence service is encrypted.

20. The system of claim 13, wherein the agent comprises a network management function and a connectivity management function, and
wherein the instructions, when executed by the one or more processors, cause the one or more processors to:
receive, by the intelligence interface, performance information associated with the one or more connectivity options for the network management function from the intelligence service; and
receive, by the intelligence interface, availability information associated with the one or more connectivity options for the connectivity management function from the intelligence service.

21. The system of claim 20, wherein at least one of the network management function or the connectivity management function is configured to transmit performance measurements to the intelligence service via the intelligence interface.

22. The system of claim 21, wherein the intelligence service is configured to update the one or more connectivity options based on the performance measurements received from at least one of the network management function or the connectivity management function.

23. The system of claim 13, wherein the intelligence service is configured to train a machine learning model using the information associated with the agent.

24. The system of claim 23, wherein the information associated with the agent comprises at least one of location information, security preference information, or connectivity performance requirement of one or more devices associated with the agent.

25. A non-transitory computer-readable medium embodying program code for providing intelligence, the program code comprising a set of instructions, stored on the computer readable medium, that when executed by a processor, cause the processor to perform the operations of:
connecting, by an intelligence interface, an agent to an intelligence service, wherein the agent is a logical entity comprising one or more functions configured to manage multipath connectivity;
transmitting, by the intelligence interface, information associated with the agent to the intelligence service;
receiving, by the intelligence interface, one or more connectivity options associated with the agent from the intelligence service, wherein the multipath connectivity intelligence is based upon the availability and quality of connectivity options configured by machine learning algorithms and used to predict availability of the one or more connectivity options, wherein the connectivity options includes a frequency channel and wherein the availability pertains to frequency channel quality and,
wherein the one or more connectivity options are used by one or more networks or one or more device functions for multipath management and scheduling.

26. The method of claim 1, wherein the intelligence service is configured to predict, using one or more machine learning algorithms, the one or more connectivity options.

27. The method of claim 26, wherein the intelligence service is further configured to predict, using the one or more machine learning algorithms, at least one of best connectivity options for different times of a day, best connectivity options as a function of predicted trajectory of a device associated with the agent, or best connectivity options for predicted traffic generated by the device.

28. The system of claim 13, wherein the intelligence service is configured to predict, using one or more machine learning algorithms, the one or more connectivity options.

29. The system of claim 13, wherein the intelligence service is further configured to predict, using the one or more machine learning algorithms, at least one of best connectivity options for different times of a day, best connectivity options as a function of predicted trajectory of a device associated with the agent, or best connectivity options for predicted traffic generated by the device.

* * * * *